(12) United States Patent
Awadalla et al.

(10) Patent No.: US 10,361,891 B2
(45) Date of Patent: Jul. 23, 2019

(54) FAST LEAST-MEAN-SQUARE (LMS) EQUALIZATION

(71) Applicant: Infinera Corporation, Sunnyvale, CA (US)

(72) Inventors: Ahmed Awadalla, Gatineau (CA); Han Henry Sun, Ottawa (CA); Kuang-Tsan Wu, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/392,228

(22) Filed: Dec. 28, 2016

(65) Prior Publication Data

US 2018/0183631 A1    Jun. 28, 2018

(51) Int. Cl.
*H04L 25/03*    (2006.01)
*H04B 10/035*    (2013.01)
*H04B 10/27*    (2013.01)

(52) U.S. Cl.
CPC ..... *H04L 25/03076* (2013.01); *H04B 10/035* (2013.01); *H04B 10/27* (2013.01); *H04L 2025/03636* (2013.01); *H04L 2025/03675* (2013.01); *H04L 2025/03687* (2013.01); *H04L 2025/03802* (2013.01)

(58) Field of Classification Search
CPC ..... H04L 25/03076; H04L 2025/03687; H04L 2025/03636; H04L 2025/03802; H04L 2025/03675; H04L 25/03019; H04L 25/03; H04L 27/01; H04B 10/27; H04B 10/035
See application file for complete search history.

(56) References Cited

U.S. PATENT DOCUMENTS

| 5,557,644 | A | * | 9/1996 | Kuwabara | H04L 27/0012 375/232 |
| 6,222,964 | B1 | * | 4/2001 | Sadot | G02F 1/225 385/32 |
| 6,696,886 | B1 | * | 2/2004 | Ke | H03L 7/107 327/156 |
| 7,606,498 | B1 | * | 10/2009 | Wu | H04B 10/60 398/152 |
| 8,879,663 | B1 | * | 11/2014 | Haddadin | H04B 1/0475 375/295 |
| 9,537,683 | B1 | * | 1/2017 | Zamani | H04L 25/03273 |
| 2004/0091037 | A1 | * | 5/2004 | Balasubramonian | H03H 21/0012 375/232 |

(Continued)

OTHER PUBLICATIONS

K.-T. Wu et al., "Techniques in Carrier Recovery for Optical Coherent Systems," OFC/NFOEC Technical Digest, 2012.

(Continued)

*Primary Examiner* — Jean B Corrielus
(74) *Attorney, Agent, or Firm* — David L. Soltz

(57) ABSTRACT

Apparatus and methods may provide improved equalizer performance, e.g., for optical-fiber-based communication systems. A least-mean-square (LMS) equalizer may include a decision feedback path containing feedback carrier recovery (FBCR), which may have low latency, and which may thus enable high-speed tap updating in the equalizer. Feedforward carrier recovery (FFCR) may be applied, in parallel with the FBCR, to provide equalizer output by compensating, e.g., for phase noise, with improved carrier recovery/compensation, versus using FBCR to generate the output.

21 Claims, 20 Drawing Sheets

(56) References Cited

U.S. PATENT DOCUMENTS

| | | | |
|---|---|---|---|
| 2007/0053261 A1* | 3/2007 | Frisson | G11B 20/10009 |
| | | | 369/47.28 |
| 2010/0104045 A1* | 4/2010 | Santraine | H03D 3/009 |
| | | | 375/324 |
| 2010/0322348 A1* | 12/2010 | Tomezak | H04L 25/022 |
| | | | 375/298 |
| 2016/0315714 A1 | 10/2016 | Awadalla et al. | |
| 2017/0214473 A1* | 7/2017 | Roberts | H04B 10/6971 |

OTHER PUBLICATIONS

T. Xu et al., "Analytical Investigations on Carrier Phase Recovery in Dispersion-Unmanaged n-PSK Coherent Optical Communication Systems," accepted for publication in Photonics; available for online download as of Aug. 23, 2016.

T. Xu et al., "Digital Adaptive Carrier Phase Estimation in Multi-Level Phase Shift Keying Coherent Optical Communication Systems," IEEE Int'l Conf. on Info. Sci. and Control. Eng'g, 2016.

E. Ip et al., "Coherent Detection in Optical Fiber Systems," Optics Express, vol. 16, No. 2, Jan. 21, 2008.

T. Xu et al., "Comparative Study on Carrier Phase Estimation Methods in Dispersion—Unmanaged Optical Transmission Systems," 2016.

D.N. Godard, "Self-Recovering Equalization and Carrier Tracking in Two-Dimensional Data Communication," IEEE Trans. on Communications, vol. COM-28, No. 11, Nov. 1980.

S. Haykin, Adaptive Filter Theory, Prentice-Hall, 1986, pp. 217, 237.

* cited by examiner $$\mathbf{H}_{XX}(k+1) = \mathbf{H}_{XX}(k) + \mu \cdot conj(FFT(\mathbf{u}_X)) \cdot FFT(e_X \cdot e^{j\hat{\varphi}_X})$$

$$\mathbf{H}_{XY}(k+1) = \mathbf{H}_{XY}(k) + \mu \cdot conj(FFT(\mathbf{u}_X)) \cdot FFT(e_Y \cdot e^{j\hat{\varphi}_Y})$$

$$\mathbf{H}_{YX}(k+1) = \mathbf{H}_{YX}(k) + \mu \cdot conj(FFT(\mathbf{u}_Y)) \cdot FFT(e_X \cdot e^{j\hat{\varphi}_X})$$

$$\mathbf{H}_{YY}(k+1) = \mathbf{H}_{YY}(k) + \mu \cdot conj(FFT(\mathbf{u}_Y)) \cdot FFT(e_Y \cdot e^{j\hat{\varphi}_Y})$$

FIG. 2B
Related Art

For $p = 2$ and QPSK,
$e_X = d_X(|d_X|^2 - R_2) = d_X(|d_X|^2 - \text{constant})$ $$\mathbf{H}_{XX}(k+1) = \mathbf{H}_{XX}(k) + \mu \cdot conj(FFT(\mathbf{u}_X(k))) \cdot FFT(\mathbf{e}_X(n))$$

FIG. 2C
Related Art

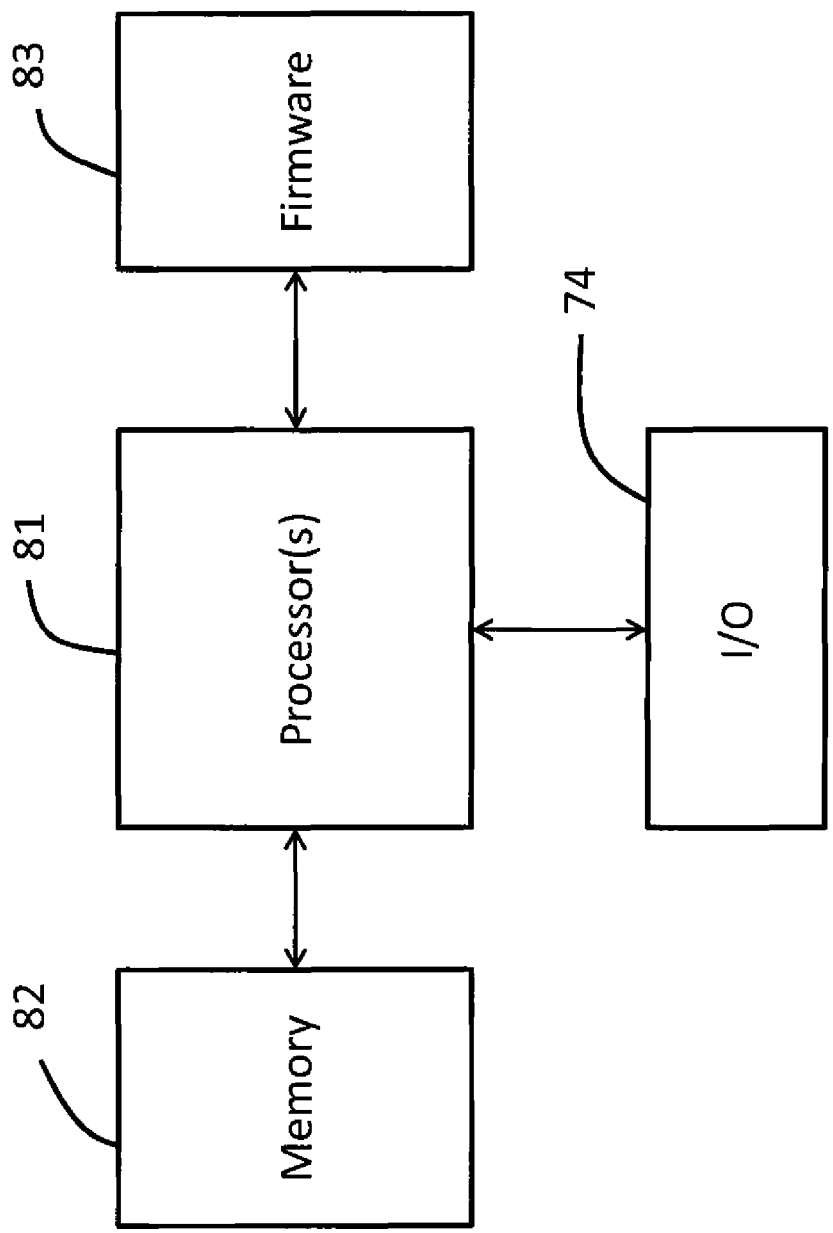

FAST LEAST-MEAN-SQUARE (LMS) EQUALIZATION

FIELD

Various aspects of the present disclosure may relate to adaptive equalization in which the equalizer filter weights may be adjusted using least-mean-square (LMS) adaptation. Such equalization may be used in optical communication systems.

BACKGROUND

Many communication systems, for example, but not limited to, optical communication systems, may be subject to signal distortion and/or inter-symbol interference (ISI), which may be introduced by such effects as dispersion and/or distortion encountered during transmission over a medium (e.g., but not limited to, an optical fiber). In the case of optical fiber communications, for example, polarization mode dispersion may cause such distortion/ISI. Another example of distortion in optical fiber communication systems may be polarization transients, e.g., due to lightning strikes (this may typically happen when an optical fiber is disposed within a ground wire on electrical poles/towers; when lightning strikes, it may have the effect of inducing a magnetic field that may rotate the polarization of light traveling through the fiber; because of the large electrical current and the speed of a lightning strike, the induced polarization rotation rate may be very high (and is known to be highest in fiber-optic channels) and may generally result in data loss in most commercial fiber transmission systems, which generally do not address this problem). Typical communication systems may mitigate the effects of distortion/ISI using various types of equalizers, which are signal filtering systems that may be designed to compensate for non-ideal channels, signal distortion, ISI, polarization transients, etc. However, some types of distortion/ISI, including, for example, polarization transients due to lightning strikes, may result in a quickly-varying channel, which may thus be best served by a quickly-adapting equalizer.

Many equalizers include some type of tapped delay-line filter, e.g., as shown in FIG. 1, which may have coefficients ($c_i$) that may be multiplied by the incoming signal samples ($v_i$), and in which the multiplication results may be summed (note that the "D" in FIG. 1 may represent a unit time delay, but this is not intended to be limiting, and other delays may be possible). Note that the signal samples and the coefficients may be real numbers or, more generally, complex numbers. Some equalizers may have multiple tapped delay-line filters, e.g., where one of the filters may be used to filter results obtained from the other filter, e.g., but not limited to, for purposes of feedback. Other equalizer structures are may also be possible, including frequency-domain implementations, in which the incoming signal samples may be transformed, e.g., using a fast-Fourier transform (FFT) block, into a frequency-domain signal and the coefficients may be determined in the frequency domain, and block multiplication of the frequency-domain signal and coefficients may be implemented, e.g., using block overlap-and-save or block overlap-and-add techniques (as are well-known in the art) to arrive at the same result (the immediate result may be in the frequency domain and may be transformed back to the time domain, e.g., using an inverse FFT (IFFT) block).

Some equalizers are adaptive equalizers, in which filter coefficients (e.g., the $c_i$ of FIG. 1) may be adjusted to better mitigate the various deleterious effects, e.g., those discussed above. An adaptive equalizer may use some algorithm to adjust the weights. Some examples of adaptive equalizers may include, but are not limited to, decision-feedback equalizers, adaptive zero-forcing equalizers, mean-square-error (MSE) adaptive equalizers, and least-mean-square (LMS) adaptive equalizers.

FIG. 2 shows an example of a structure of a generic equalizer using decision detected error and the input signal samples to update the filter coefficients (i.e., weights; also referred to as "taps" or "tap-weights"). FIG. 2 shows a filter 21. Filter 21 may be implemented as a digital filter having weights, e.g., an finite impulse response (FIR) filter or an infinite impulse response (IIR) filter; such filters may be implemented by means of a programmed processing device and/or using discrete components, such as adders and multipliers, i.e., in the form of a circuit, and which may be implemented in the time domain or in the frequency domain, as discussed above). FIG. 2 further shows a decision device/circuit 22 that may be used to decide a value for a received bit or symbol. Such decision device/circuit 22 may be, e.g., but is not limited to, a comparator (which may be a multi-level comparator (which may include or be implemented in the form of a maximum-of or minimum-of determiner)) or other decision device (which, similarly, may be implemented using discrete electrical components, as a circuit), a symbol de-mapper (including a device for making a symbol decision, such as a bi-level or multi-level comparator), which may be preceded by various hardware or software designed to compute a decision variable, and which may include multipliers, adders, etc., and/or a processor executing software; this may be performed in complex space and may involve, for example, determining a nearest neighbor (out of known candidate symbols values in a complex symbol space) to received complex symbol values, or the like). According to some aspects of this disclosure, decision device/circuit 22 (and similar components in FIGS. 3, 4, 6A, 6B and 9D) may perform an error determination, based on blind or non-blind equalization techniques, and provide an error value as an output, which may be input to tap-weight updater 23 (or otherwise, tap-weight updater 23 may determine the error value, as discussed below). Finally, FIG. 2 also shows a tap-weight updater 23. The updated tap weights may be derived as a function of the input samples and the output samples (or, in the case of FIG. 2, as a function of the input samples and the decision outputs from block 22). For example, updates may be determined as a function (which may be a vector function) of one or more differences between inputs and outputs (which may be sets of inputs and outputs), which differences may be squared, and may be applied to a previous set of tap weights (e.g., by adding such a function, which may be weighted by a constant or vector weight, for example, to previous tap weights). It should be noted that, in the alternative aspect discussed above, in which the decision device/circuit 22 provides error output, the difference(s) may be the output(s) of decision device/circuit 22 (and, again, this applies to similar components of other figures, as discussed above). The function may be, for example, based on MSE or LMS techniques. These may be implemented, for example, using one or more programmed digital signal processors, combinations of adders and multipliers, etc.

In some communication systems, for example, but not limited to, fiber-optic communication systems, the carrier signal may be subject to, for example, phase noise and/or polarization mode dispersion (PMD). For example, in a fiber-optic communication system, the (optical) carrier signal(s) may be generated by one or more lasers, which may be particularly subject to phase noise. Therefore, as shown in FIG. 3, a carrier recovery device 31 may be inserted, which may remove the phase noise. Carrier recovery techniques and structures for optical communication systems are known in the art; see, e.g., K.-T. Wu et al., "Techniques in Carrier Recovery for Optical Coherent Systems," *OFC/NFOEC Technical Digest*, 2012 (hereinafter, "Wu et al."); T. Xu et al., "Analytical Investigations on Carrier Phase Recovery in Dispersion-Unmanaged n-PSK Coherent Optical Communication Systems," accepted for publication in Photonics, available for online download as of Aug. 23, 2016; T. Xu et al., "Digital Adaptive Carrier Phase Estimation in Multi-Level Phase Shift Keying Coherent Optical Communication Systems," IEEE Int'l Conf. on Info. Sci. and Control Eng., 2016; E. Ip et al., "Coherent Detection in Optical Fiber Systems," *Optics Express*, Vol. 16, No. 2, Jan. 21, 2008; and T. Xu et al., "Comparative Study on Carrier Phase Estimation Methods in Dispersion-Unmanaged Optical Transmission Systems," 2016.

In an example implementation, as shown in FIG. 4, a delay 41 may need to be inserted, in order to compensate for the delays introduced by carrier recovery 31 and decision device 22 (in many cases, the delay introduced by decision device 22 may be negligible, relative to delay introduced by carrier recovery 31; but this disclosure is not thus limited). That is, it may be necessary to ensure that the input samples are coordinated with corresponding decision samples, such that corresponding samples reach the tap updater 23 at substantially the same time. This delay (i.e., on both sides of the equalizer) may determine the speed with which the taps can be updated and thus the maximum speed of channel change that can be equalized. Note that delay 41 may be implemented as a delay circuit (e.g., shift register, flip-flop(s), or other delay-inducing circuits/devices) or in software, in the case of a software-based implementation. It may be desirable to reduce the delay (delay 41 and delay introduced by carrier recovery 31 and decision device 22) in order to be able to adapt the equalizer more quickly, e.g., to mitigate fast polarization transients and/or other channel effects.

SUMMARY OF VARIOUS ASPECTS OF THE DISCLOSURE

Various aspects of the present disclosure may relate to adaptive equalizer architectures that may address the above-mentioned shortcoming (i.e., which may increase adaptation speed). Such architectures may be use LMS tap updating for a filter of the equalizer and may use both feed-forward and feedback carrier recovery, which may be disposed so as to provide both high-quality output results and increased speed for LMS tap updating.

Implementations may be in the form of hardware, software, firmware, or combinations thereof, including executable instructions stored on a non-transitory computer-readable medium, e.g., a memory device, that may be executed on one or more processing devices. Various components may be implemented in one or more chips, chipsets, circuit boards, etc., or in the form of one or more programmed processors.

BRIEF DESCRIPTION OF THE DRAWINGS

Various aspects of the disclosure will now be described in conjunction with the accompanying drawings, in which:

FIGS. 2A-2E show conceptual block diagrams and various equations relating to equalization and carrier recovery that may be incorporated into various aspects of the present disclosure;

FIG. 8 shows a conceptual block diagram of an implementation, according to various aspects of the present disclosure.

DETAILED DESCRIPTION OF VARIOUS ASPECTS OF THE DISCLOSURE

Figure 1:
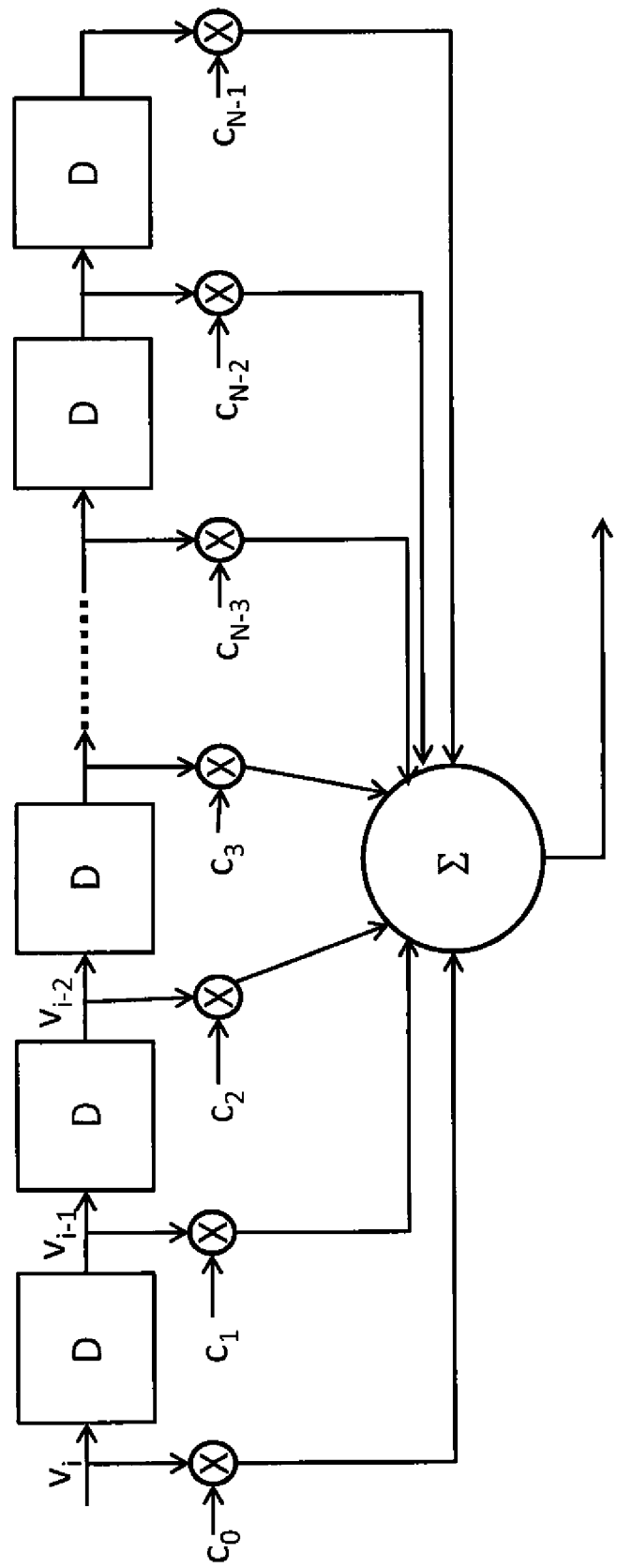
FIG. 1 shows a conceptual block diagram of a tapped delay-line-type filter that may be incorporated in various aspects of the present disclosure.
Figure 2:
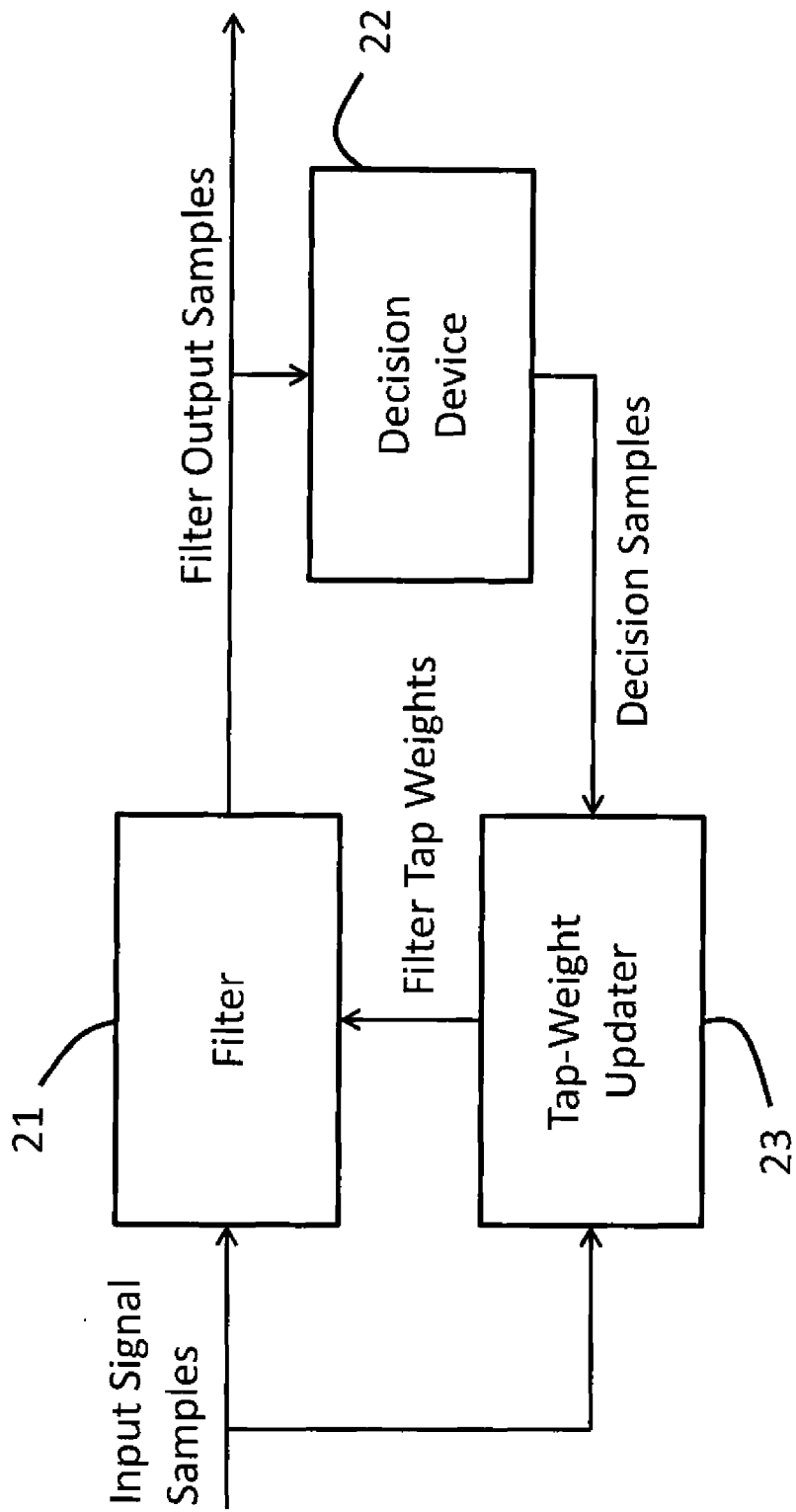
FIG. 2 shows a conceptual block diagram of an equalizer that may be incorporated in various aspects of the present disclosure.
Figure 2A:
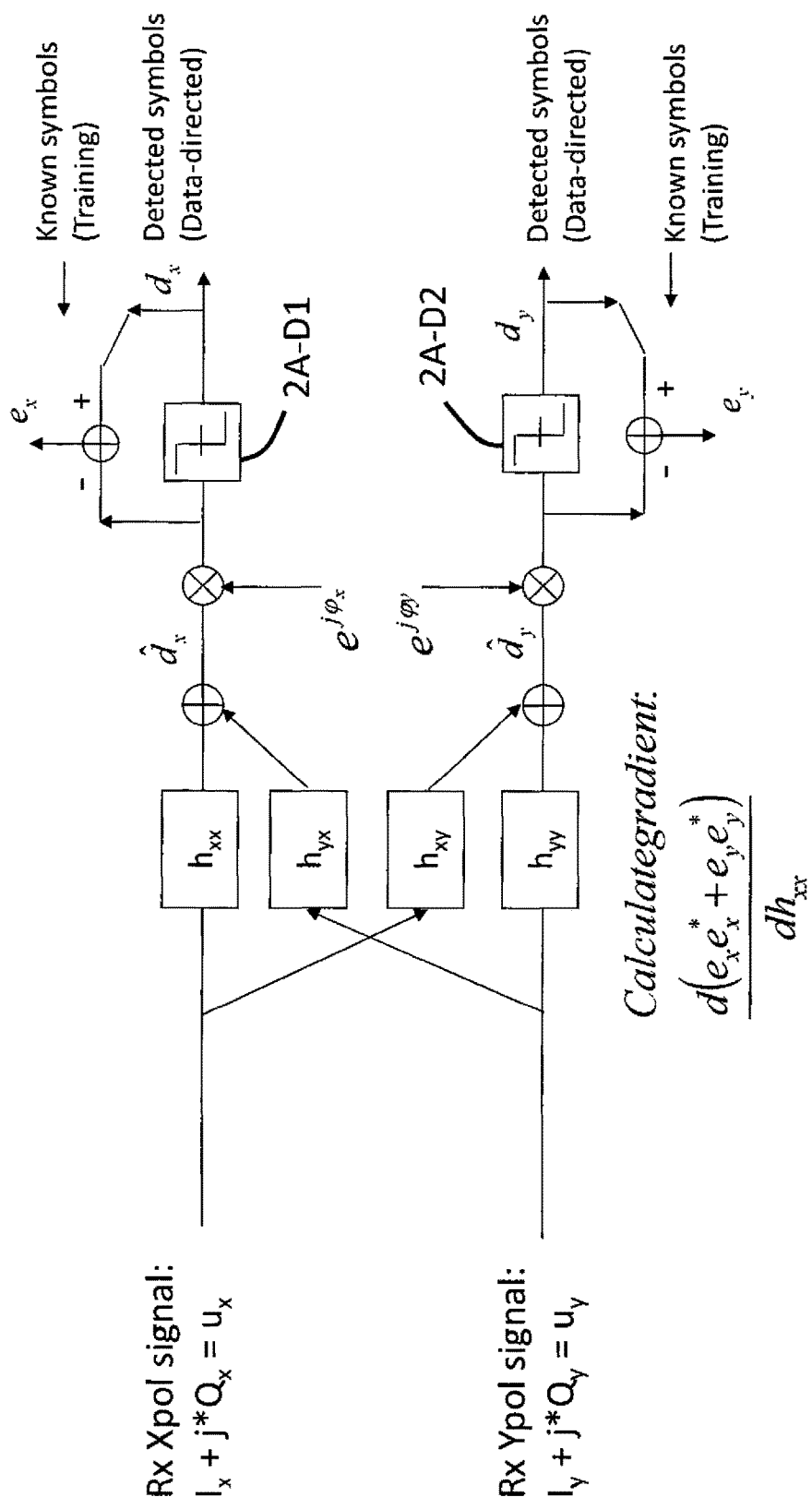

Various aspects of this disclosure may relate to adaptive equalizer architectures, which may be of use, for example, in fiber-optic communication systems, e.g., to compensate for phase noise, polarization mode dispersion, etc. The equalizer architectures may incorporate a filter, e.g., an FIR filter, to filter input signal samples, where the filter may use a set of tap-weights, in conjunction with one or more tapped delay lines, to multiply variously-delayed input signal samples to thus generate filter outputs. The filter may be implemented in the time domain or in the frequency domain. The filter tap weights may be adaptable by means of a tap-weight updater, which may be implemented as an LMS tap-weight updater. The LMS tap-weight updater may receive as inputs (delayed versions of) the input signal samples and decisions made based on the filter outputs having undergone carrier recovery. To be more precise, as explained in S. Haykin, *Adaptive Filter Theory*, Prentice-Hall, 1986, pp. 217, 237, the basic form of the LMS adaptation algorithm may generally follow the following two equations:

$$e(n)=d(n)-\hat{w}^H(n)u(n), \text{ and}$$

$$\hat{w}(n+1)=\hat{w}(n)+\mu u(n)e^*(n),$$

where u(n) represents a tap input vector at time n, e(n) represents estimation error at time n (based on the current tap-weight vector, $\hat{w}(n)$, which may correspond to a vector of the tap weights $c_i$ of FIG. 1 at time n), the superscript "H" denotes a Hermitian transpose operation, d(n) represents a desired response at time n, and μ, represents an adaptation step size (which may be set as a predetermined constant between zero and two times the inverse of total input power). With some manipulation, these equations may, equivalently, be restated as:

$$e(n)=d(n)-\hat{w}^H(n)u(n), \text{ and}$$

$$\hat{w}(n+1)=\hat{w}(n)+\mu u(n)e^*(n),$$

where "T" denotes a transpose operation. It is well-known in the art that these equations may be implemented in hardware, software, or combinations thereof. Note that this may be applicable to blind equalization, where the incoming symbols are unknown and may be inferred from the from the received signal to create the d(n), or to equalization in which known (or "pilot") symbols are sent, and in which the known symbol values may be used as the d(n) (frequently referred to as "training symbols," and the corresponding process as "training" the equalizer); using the errors derived based in either of these ways may be used to update the tap weights of the equalizer. For the specific case of a coherent optical receiver, e.g., as shown in FIG. 1, the LMS tap-weight updating equations may be modified based on the presence of signals received on two polarization modes, x and y. This is reflected in the (time-domain) block diagram shown in FIG. 2A. In FIG. 2A, $u_x$ and $u_y$ may represent (samples of) signals received on the x- and y-polarized channels, respectively. Four filters, $h_{xx}$, $h_{yx}$, $h_{xy}$, and $h_{yy}$ may be implemented as time-domain (e.g., with the delay-line structure shown in FIG. 1) or frequency-domain filters. The outputs of the filters may be combined as shown to result in estimated outputs for the x and y polarization channels, $\hat{d}_x$ and $\hat{d}_y$, respectively. These may be phase-shifted using an estimate, φ, of phase error (e.g., laser phase error, which may be different ($φ_x$, $φ_y$) for the x and y polarizations), as a phase correction. The results may be applied to decision devices, 2A-D1 and 2A-D2, and the resulting outputs (detected symbols) may be compared with the respective inputs to derive respective error values, $e_x$ and $e_y$. Gradients may then be calculated for adaptation of the coefficients of the respective filters, $h_{xx}$, $h_{yx}$, $h_{xy}$, and $h_{yy}$ (shown explicitly for $h_{xx}$, and the others are computed similarly, as would be apparent to one skilled in the art).

Continuing with the example of $h_{xx}$, using a steepest-descent update algorithm, one may obtain the following time-domain equation for updating the tap-weights of $h_{xx}$ (and similar equations may be obtained for the other filters): $h_{xx}(n+1)=h_{xx}(n)+\mu u^*_x(n)e_x(n)e^{-jφ}$. Here, $h_{xx}$ represents the time-domain tap-weight vector of the $h_{xx}$ filter, and $u_x^*(n)$ represents the complex conjugate of the tap inputs of the $h_{xx}$ filter at time n (e.g., if there were 256 taps, this would correspond to the last 256 values of $u_x$, including the present value at time n, in vector form). Similarly, as a further example, the tap-update equation for the $h_{yx}$ filter may be characterized by the following equation: $h_{yx}(n+1)=h_{yx}(n)+\mu u_y^*(n)e_x(n)e^{-jφ}$.

Figure 2D:
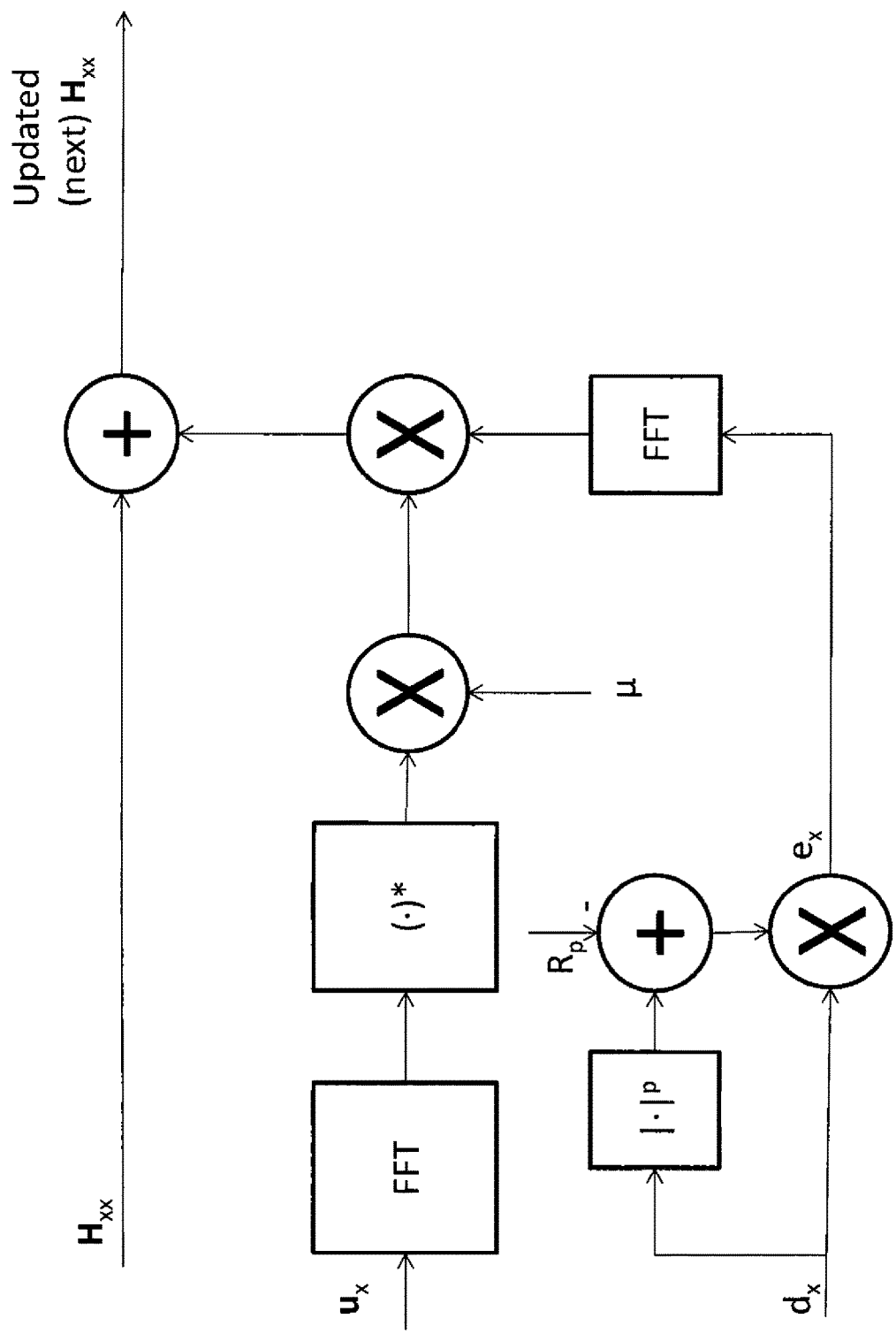
Figure 2E:
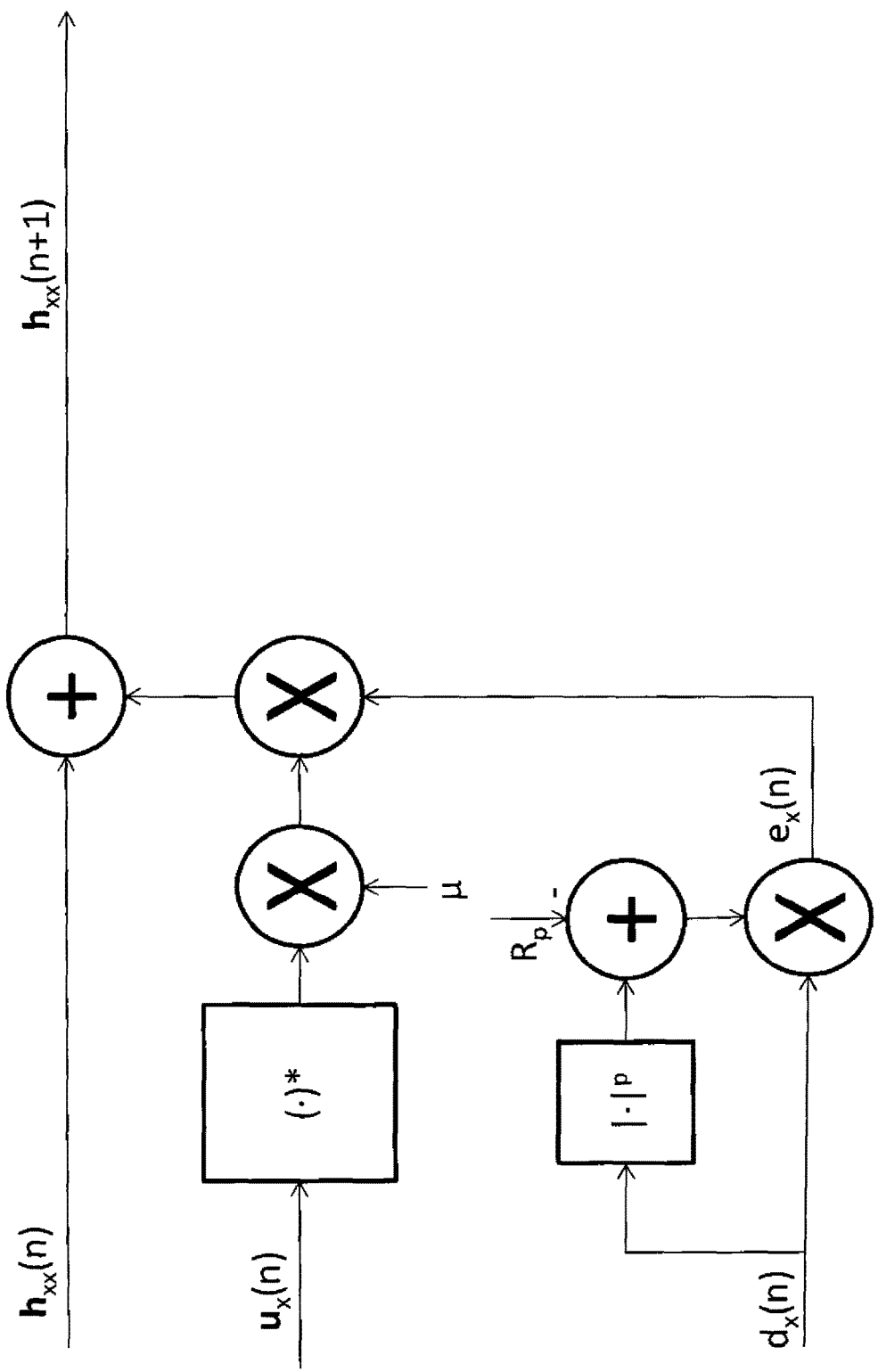

In some cases, according to various aspects of this disclosure, tap-weight updating may be performed in the frequency domain. FIG. 2B shows the four update equations for the four filters shown in FIG. 2A, in the frequency domain. Finally, it may be desirable to use blind equalization (i.e., where the "desired" values are not known, a priori), to avoid the need for transmission of known symbol values, which would increase transmission overhead (i.e., decrease data-carrying capacity). This problem was addressed, e.g., in D. N. Godard, "Self-Recovering Equalization and Carrier Tracking in Two-Dimensional Data Communication," *IEEE Trans. on Communications*, Vol. COM-28, No. 11, November 1980, in which the LMS update equations for blind equalization were derived, as shown in FIG. 2C (which shows the error update equation for the specific case of quadrature phase-shift keying (QPSK) and p=2 (p refers to the dimension of the signal constellation, and note that $R_p$ is a constant based on the dimension, p), along with the tap-update equation, in the frequency domain, for the $h_{xx}$ filter; this may be generalizable to other modulation types and dimensions, as set forth in the above-noted article). FIG. 2D shows an example of an implementation of such a frequency-domain tap-weight updater for the $h_{xx}$ filter (again, the other filters may have similar tap-updaters) in hardware, according to an aspect of this disclosure; this represents a transformation of the above equation for $h_{xx}$(n+1) into the frequency domain. FIG. 2E shows a corresponding structure for the $h_{xx}$ filter for performing tap-updating in the time domain (i.e., a hardware implementation of the same equation). Software-based implementations of the hardware, e.g., as shown in FIG. 8, are also possible. It is also noted that similar equations and hardware implementations may be obtained for equalizer tap-weight updating based on known symbol values; such equations are similar to those for blind equalization and are known in the art and are not repeated here (in particular, the main difference is that error (e(n)) is determined as a difference between a known symbol and a symbol output of a decision device).

To reiterate, hardware/circuit-based implementations of the various operations needed to compute the various updated tap-weights are known, and so it would be within the knowledge of one of ordinary skill in the art to implement the tap-weight updater in hardware, software, or combinations thereof, e.g., as demonstrated by FIGS. 2D and 2E.

In order to increase processing speed and enable compensation of faster varying channels than might otherwise be possible to compensate, feedback carrier recovery (FBCR) may be applied to the filter outputs, within the equalizer, prior to generating the decision values provided to the tap-weight updater; at the same time, feed-forward carrier recovery (FFCR) may be applied to the filter outputs to generate phase-compensated outputs.

The adaptive equalizer architecture, according to various aspects of the present disclosure, may improve upon prior techniques, e.g., by using FFCR in the equalizer output path and FBCR in the decision feedback path. This may enable better performance than using only a single carrier recovery block at the filter output, in that use of FBCR may increase the speed with which tap weights may be updated, which may permit compensation for quickly-varying channels (e.g., but not limited to, optical fiber channels subject to lightning-based polarization transients, as described above). On the other hand, the use of FFCR may provide improved performance (e.g., carrier phase-tracking performance; note that in a coherent receiver, including a coherent optical receiver, phase-tracking may be an important factor in correct demodulation) over using FBCR. That is, the advantages of FBCR and FFCR may both be used to provide both good speed and good performance.

Figure 5A:
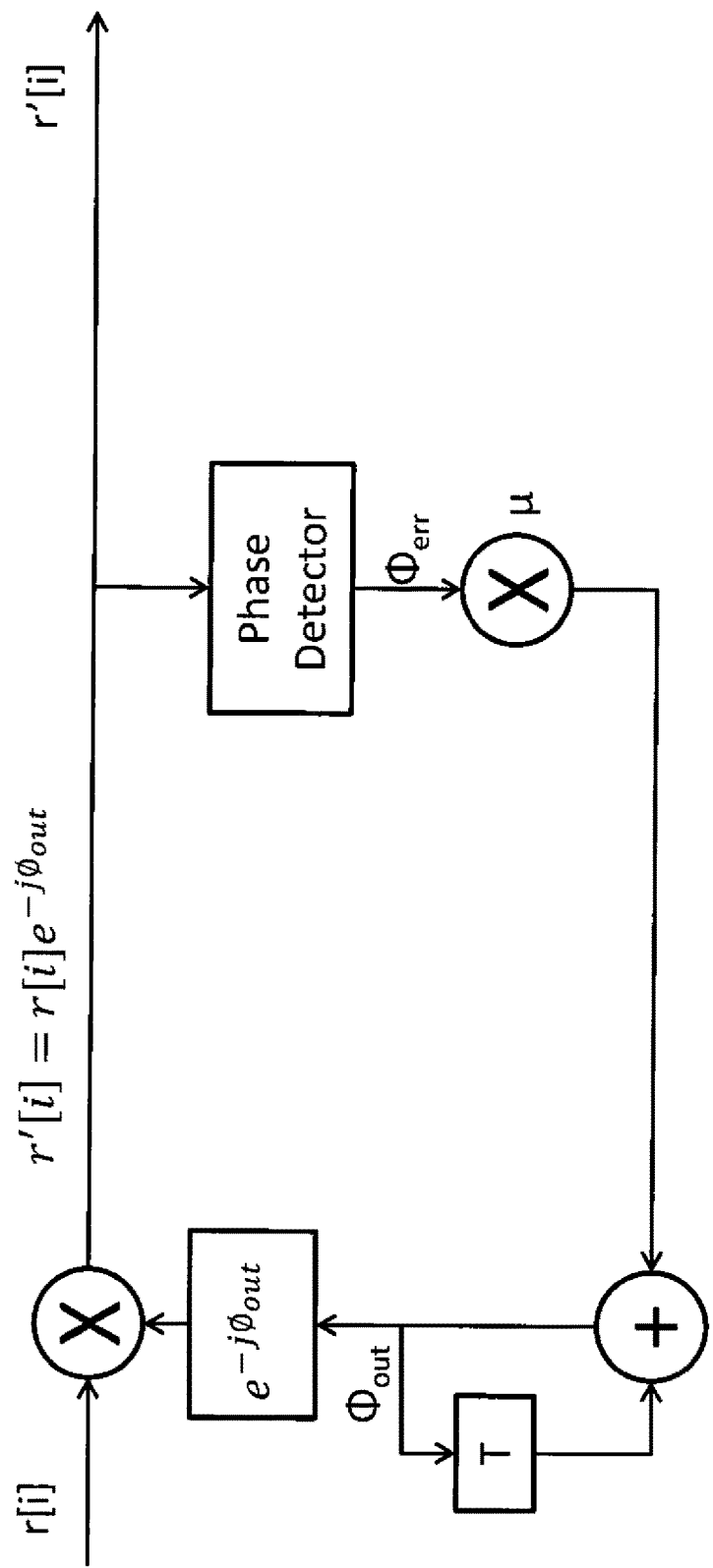
FIGS. 5A and 5B show a conceptual block diagrams of carrier recovery structures that may be incorporated in various aspects of the present disclosure.
Figure 5B:
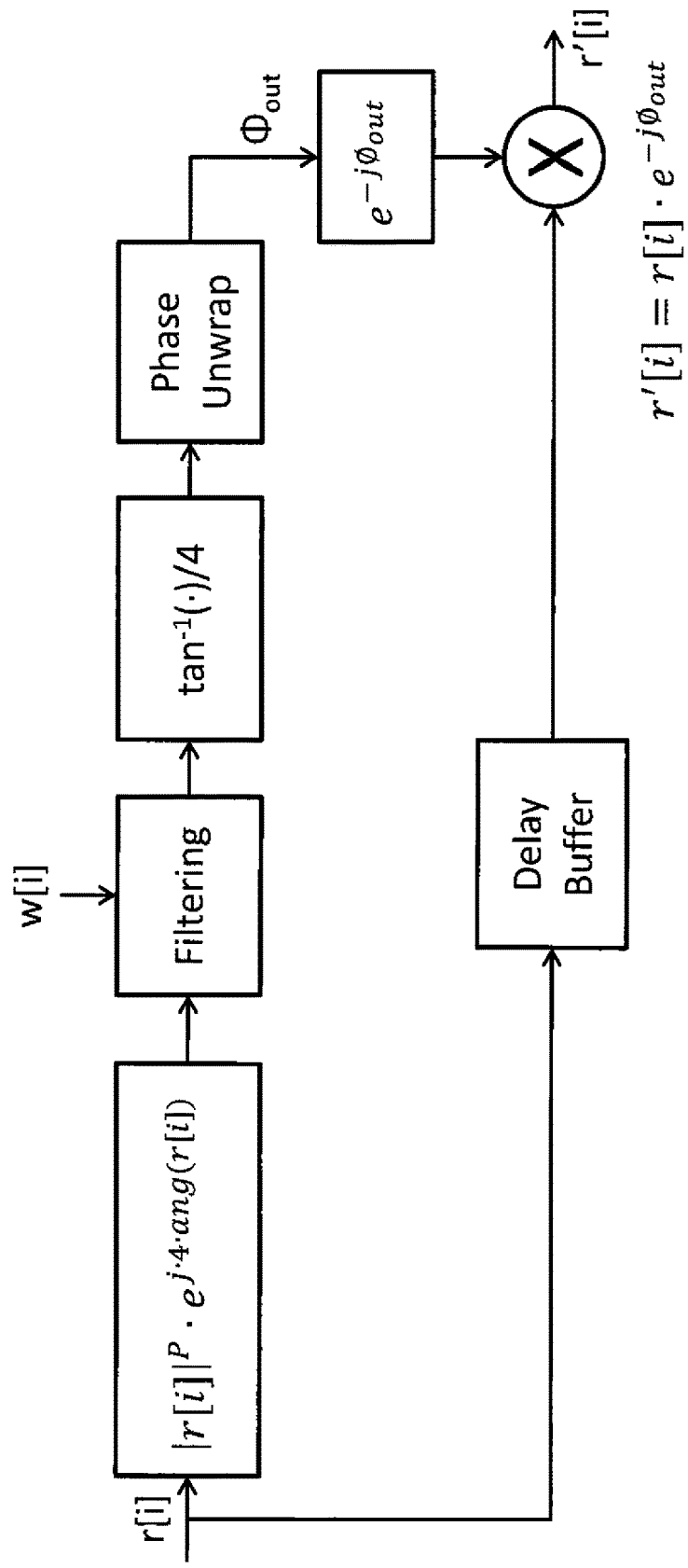

As noted above, there are various known types of carrier recovery techniques. These may fall into two classes: feedback carrier recovery (FBCR) and feed-forward carrier recovery (FFCR). Wu et al. shows non-limiting example structures of FBCR and FFCR, which are reproduced herein as FIGS. 5A and 5B (which correspond, respectively, to FIGS. 1 and 2 of Wu et al.). It is noted that there may be other implementations possible. The FBCR and FFCR may be implemented in the form of software, hardware/circuitry, or combinations. Each of FBCR and FFCR may have its own advantages and disadvantages. In general, FFCR may have excellent carrier phase-tracking performance and may be relatively easy to implement, but at the same time, it may introduce significant computational delay. On the other hand, FBCR's performance may not be as good as that of FFCR, in that it may be subject to greater phase-tracking error (defined as the difference between the phase induced in the channel between transmitter and receiver and the phase estimated by the carrier recovery block), and it may be more difficult to implement, but it may introduce much lower computational delay. However, FBCR can be implemented, and an example may be found in U.S. patent application Ser. No. 14/788,564, filed on Jun. 30, 2015, entitled, "Feedback Carrier Recovery Device" (now published as U.S. Patent Application Publication No. 2016/0315714), and incorporated by reference herein in its entirety.

Figure 4:
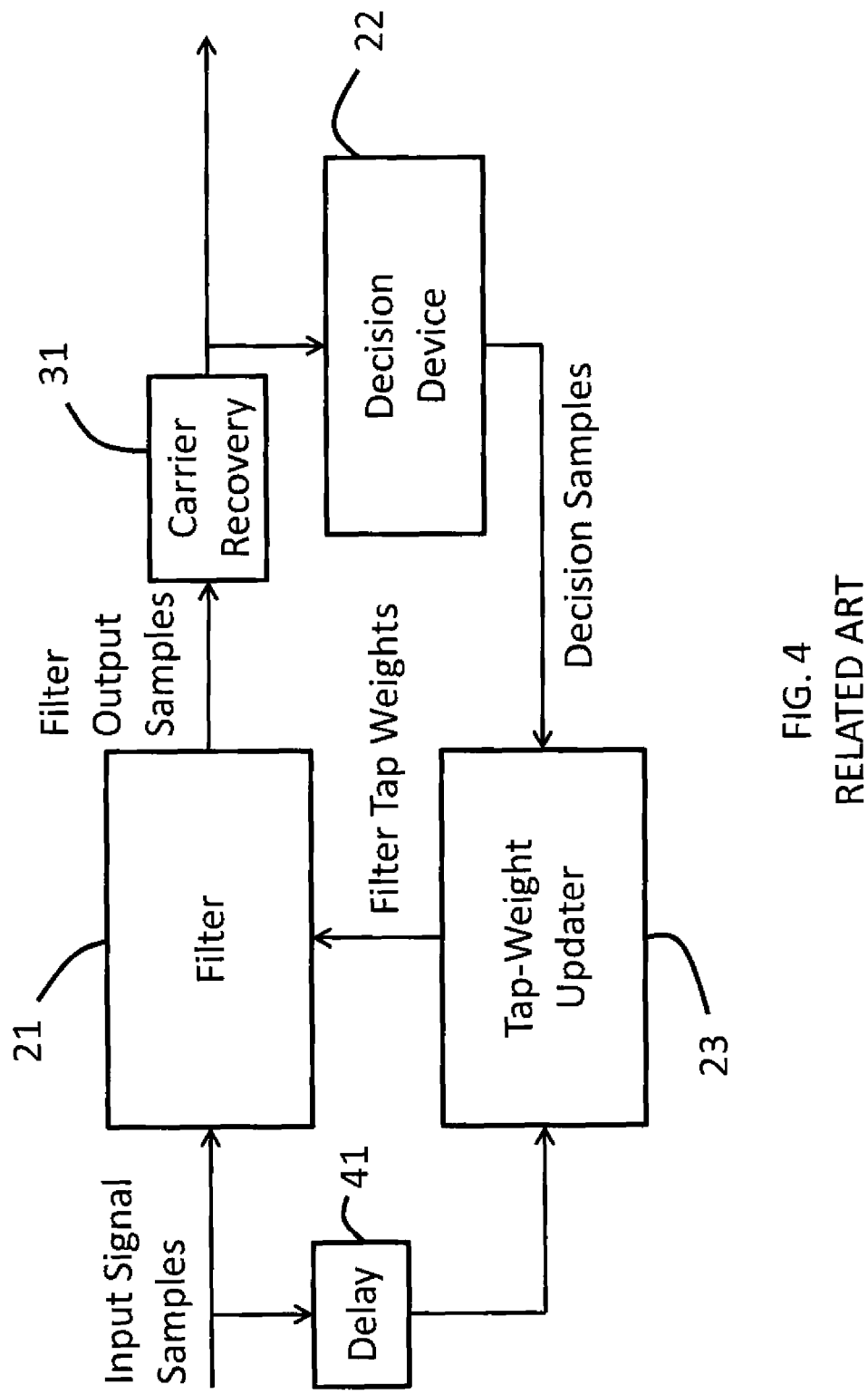
FIG. 4 shows a conceptual block diagram of yet a further equalizer structure that may be incorporated in various aspects of the present disclosure.
Figure 6A:
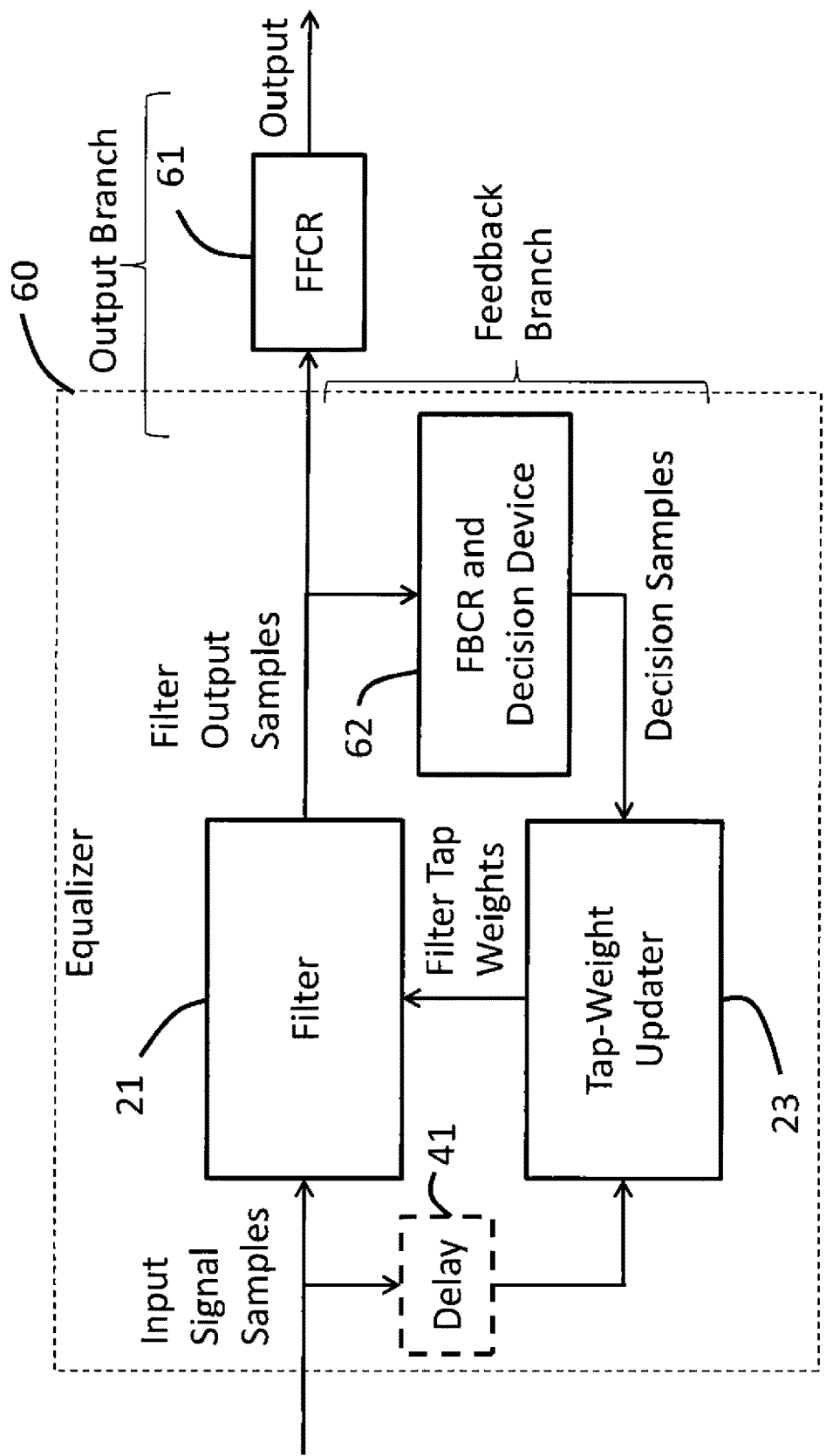
FIGS. 6A and 6B show conceptual block diagrams of, respectively, an equalizer architecture and a portion of an equalizer architecture, according to various aspects of the present disclosure.
Figure 6B:
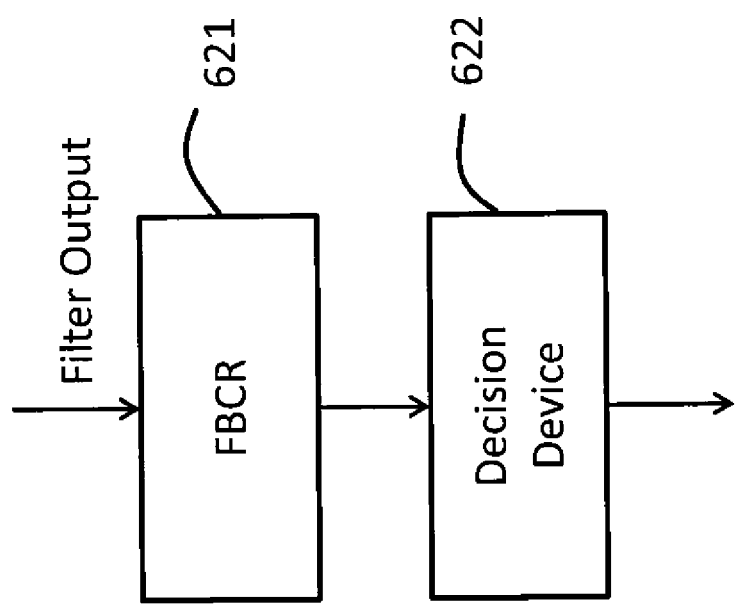
Figure 6C:
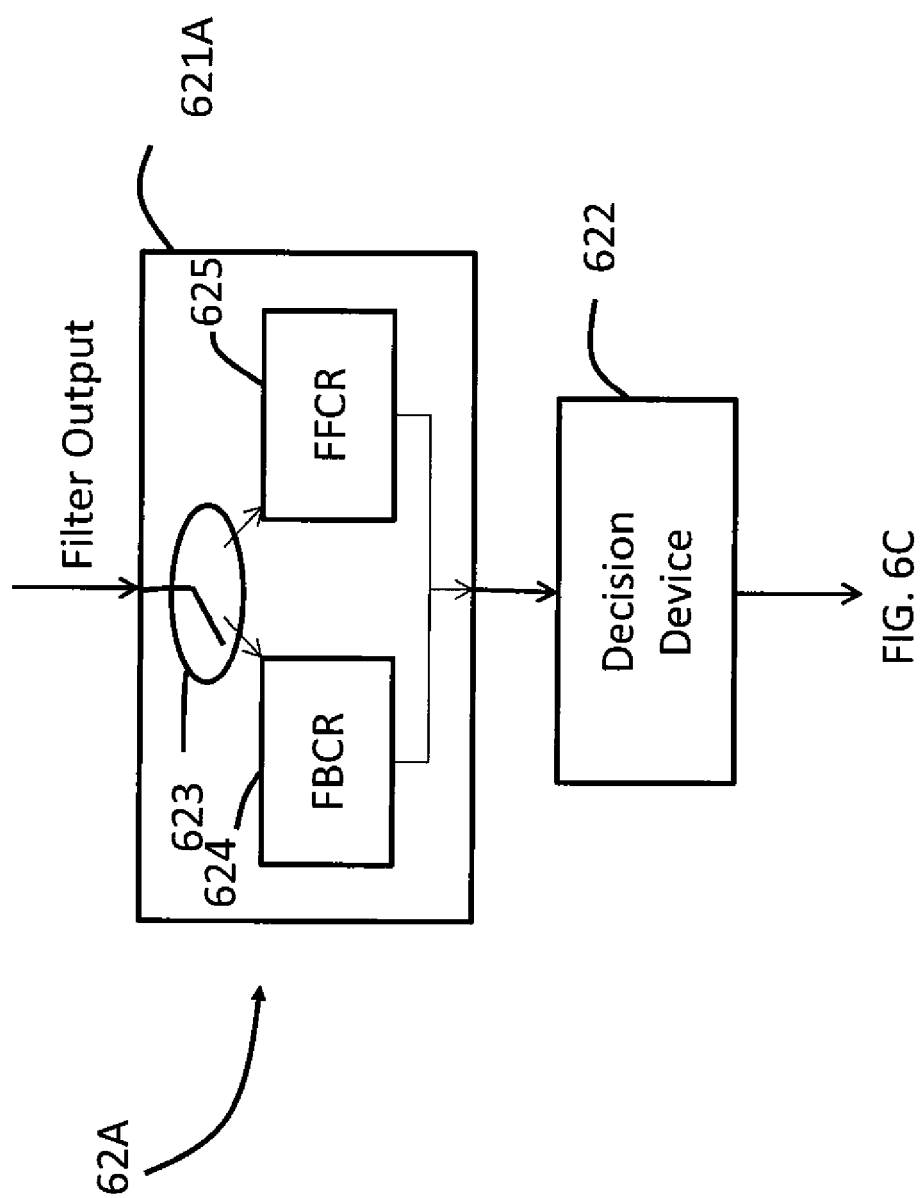
FIG. 6C shows a conceptual block diagram of a portion of the equalizer architecture of FIG. 6A, according to further aspects of the present disclosure.

FIG. 6A shows an equalizer architecture 60 according to various aspects of the present disclosure. In particular, as shown in FIG. 6A, the CR block, e.g., as in FIG. 4, may be replaced by two CR blocks 61 and 62 (the latter of which, as shown in FIG. 6A, may be integrated with the decision device; however, the two may also be implemented separately, as shown in FIG. 6B, where FBCR 621 may be followed by a decision device 622). Blocks 61 and 62 may, respectively, be implementations of FFCR and FBCR, e.g., but not limited to, the implementations shown in FIGS. 5A and 5B, respectively. By using FFCR, outside equalizer 60 (but as part of the overall equalization system), to generate the equalizer output, excellent performance may be obtained in generating the output; and by using FBCR in the decision feedback path (i.e., within equalizer 60), delay may be minimized, which may permit equalization of received signals from faster-varying channels (e.g., but not limited to, channels in which lightning-based polarization transients may occur) than may be possible if only FFCR were used, again, due to the lower delay of FBCR.

Figure 3:
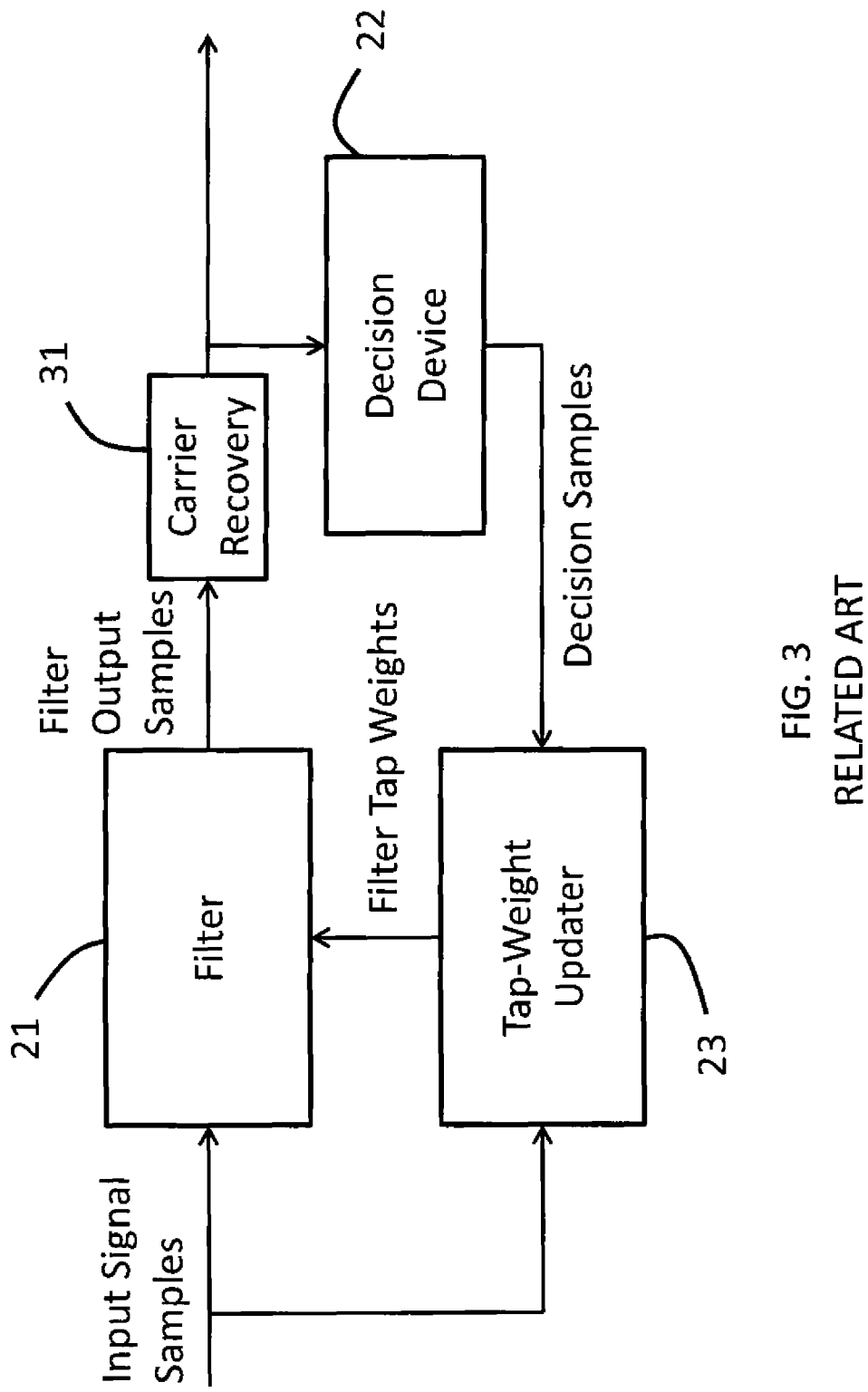
FIG. 3 shows a conceptual block diagram of further equalizer structure that may be incorporated in various aspects of the present disclosure.

By way of further explanation, equalizer architecture 60, with the FBCR 62 located only in the decision feedback path (labeled "Feedback Branch"), may output polarization-equalized output, which has not been phase-compensated. Therefore, the FFCR 61 may be applied to the equalizer 60 output to provide phase-error-compensation (with better performance (e.g., less phase-tracking error) than FBCR), in the "Output Branch." It is further noted that the structure of having two branches ("Feedback Branch" and "Output Branch") with separate carrier recovery blocks is a departure from the structure, e.g., of FIGS. 3-4, in which there is a common carrier recovery block 31 used both for feedback and output.

As discussed in conjunction with previous drawings, in FIG. 6A, the equalizer architecture 60, in addition to having the FBCR/decision device 62, may also including filter 21 and tap-weight updater 23. Tap-weight updater 23 may be designed based on LMS techniques, which may thus, in combination with filter 21, implement a portion of an LMS-adaptive equalizer. Filter 21 may be implemented, for example, as an FIR filter, but the invention is not thus limited.

Also shown in FIG. 6A is a delay 41. Delay 41, as discussed with respect to FIG. 4, may be inserted in order to coordinate arrival of input samples with decision samples at tap-weight updater 23. Delay 41 may continue to be needed, but the amount of delay needed may be lower, as a result of the use of FBCR 62.

To summarize the above, according to aspects of the present disclosure, the use of a single carrier recovery block in an equalizer, e.g., in a coherent optical receiver may be replaced by two carrier recovery blocks: FBCR in a feedback loop of the LMS adaptive equalizer, to increase adaptation speed of the equalizer (e.g., to handle quickly-varying channels, such as, e.g., optical channels with lightning-induced polarization transients), and FFCR in an output branch of the equalizer, to provide output with less phase-tracking error than would be output by FBCR. As a result, both quick adaptation and output having minimized error may be simultaneously possible.

The structures of FIGS. 6A and 6B are shown using FBCR 62, 621 in the feedback branch. As noted above, the performance of FBCR, in terms of phase-error compensation, may not be as good as that for FFCR. In some cases, the performance of FBCR may not be adequate for tap-weight updating, or there may be periods during which a greater delay may be tolerated (e.g., in the absence of lightning-induced polarization transients). Therefore, according to a further aspect of the present disclosure, the feedback branch of equalizer 60 may be provided with both FBCR 624 and FFCR 625, as part of block 62 or as part of block 621A of structure 62A. Carrier recovery block 621A may include a switch 623 that may be controlled to switch between FBCR 624 and FFCR 625, depending on prevailing conditions. For example, if it is known that the weather along the fiber-optic channel path is not likely to result in lightning, switch 623 may be switched to route the equalizer output to FFCR 625, which may provide adequate speed for "normal" conditions. However, if it is known that the weather may result in lightning strikes, switch 623 may be switched to use FBCR 624, to provide the faster adaptation speed associated with FBCR 624 (in contrast with FFCR 625). In another scenario, the FBCR 624 may be the default setting of switch 623, and if equalizer 60 does not provide adequate equalization performance (channel compensation), the switch 623 may be controlled to switch to FFCR 625, despite the attendant decrease in adaptation speed associated with FFCR 625. Switch 623 may be controlled by a processor associated with a receiver (e.g., the receiver of FIG. 6D), which may be provided with various internal system quantities (e.g., equalized signals, output symbols, etc.) and/or externally-provided information (e.g., weather information).

Figure 6D:
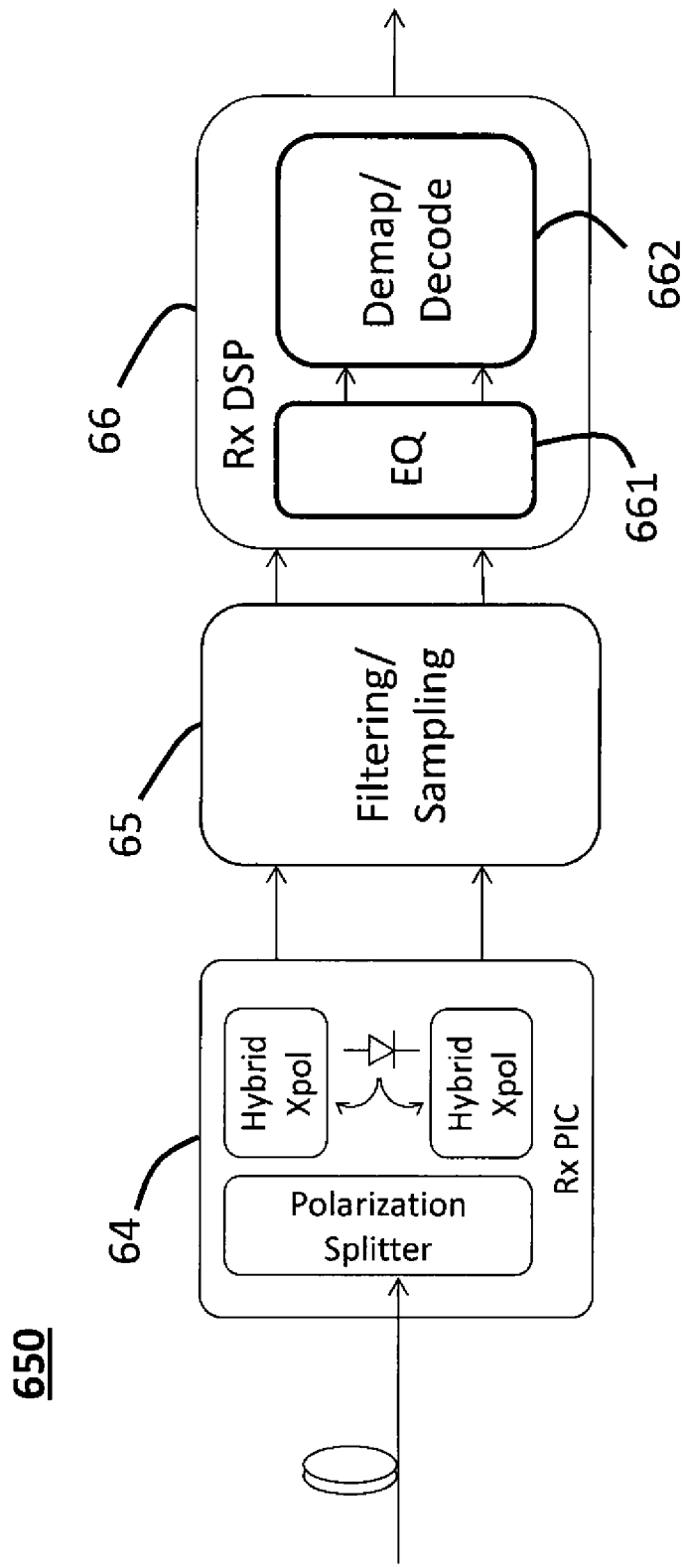
FIG. 6D shows a conceptual block diagram of an optical fiber receiver according to various aspects of the present disclosure.

FIG. 6D shows an example of a coherent optical receiver 650 that may be used as part of a fiber-optic communication system. Receiver may include a receiver front-end 64 that may receive as inputs optical signals from one or more optical fibers. Receiver front-end 64 may be implemented in the form of a photonic integrated circuit (PIC). The outputs of receiver front-end 64 may be electrical signals, which may then be filtered and sampled 65. The resulting samples may then be fed into a receiver digital signal processing block 66, which may include equalization 661 and demapping/decoding 662, the latter of which may operate on output received from the former. Equalizer 661 may be implemented in hardware, software or combinations thereof, as may be other components of the Rx DSP block. Equalizer 661 may correspond to an equalizer as shown in FIGS. 6A and/or 6B.

Figure 9A:
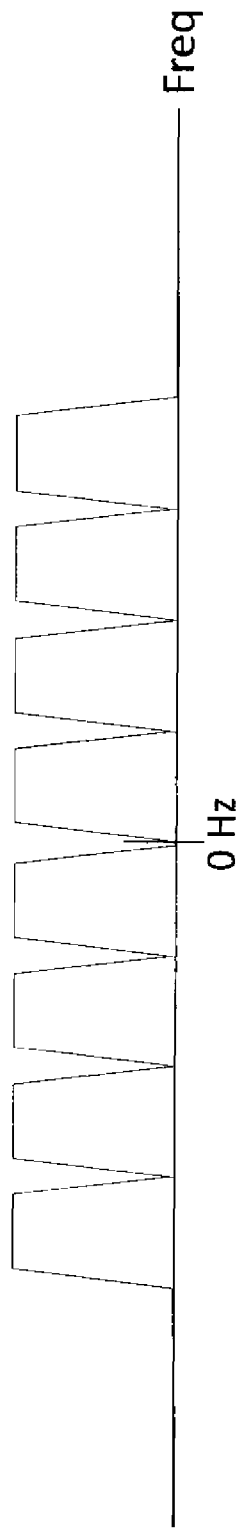
FIGS. 9A-9D depict various aspects of a fiber-optic transmission system according to various aspects of the present disclosure.
Figure 9B:
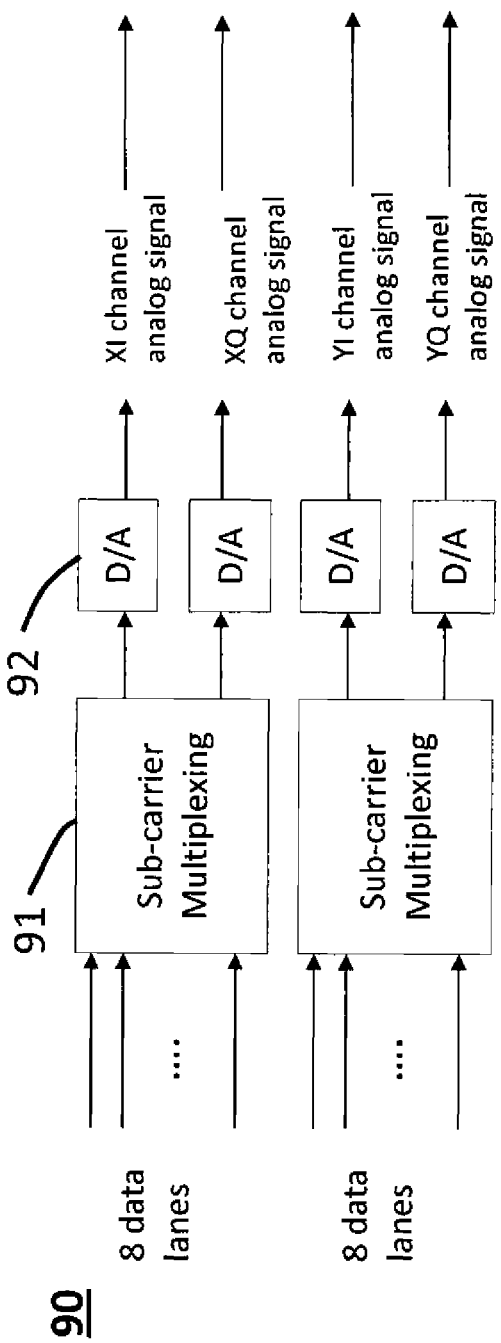

FIGS. 9A-9D show a system in which equalization as described above may be implemented, according to an aspect of the present disclosure. As shown in FIG. 9A, a modulated spectrum may be made up of eight sub-carriers, although this is not intended to be limiting, and the number may be a number other than eight. FIG. 9B shows a portion of a non-limiting example of a corresponding transmitter 90. In transmitter 90, a signal processing engine may multiplex data into eight (in this example) data streams (which may have respective in-phase (I) and quadrature (Q) sub-streams, when mapped into modulation symbols), corresponding to the eight sub-carriers. Sub-carrier multiplexers 91 may receive the data streams and may multiplex them into data streams that may correspond to cross-polarized (X and Y) carriers; each of these may include I and Q portions. The resulting signals may be converted from digital form into respective analog signals by digital-to-analog (D/A) converters 92, resulting in the four analog signals, XI, XQ, YI and YQ, shown at the right side of FIG. 9B. These signals may then be sent through other transmitter front-end components (not shown) and transmitted over an optical fiber (not shown).

Figure 9C:
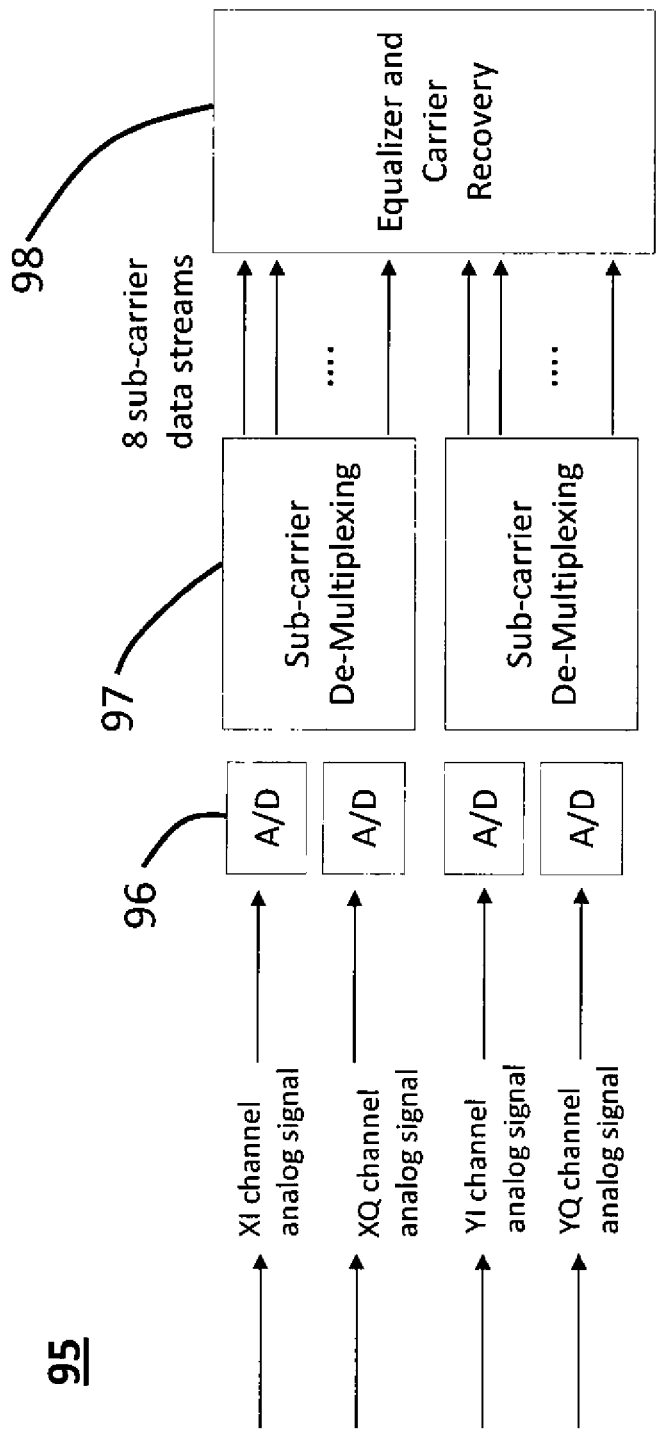

FIG. 9C shows a portion of a corresponding receiver 95. Receiver 95 may include a receiver front-end (not shown) that receives the signals from the optical fiber (not shown) and converts them into the four analog channel signals, XI, XQ, YI and YQ. These may then be converted to respective digital signals in blocks analog-to-digital (A/D) converters 96. The resulting digital signals may then be provided to sub-carrier demultiplexers 97 to demultiplex the digital signals into, in this example, eight sub-carrier data streams. These sub-carrier data streams may then be subject to equalization and carrier recovery 98.

Figure 9D:
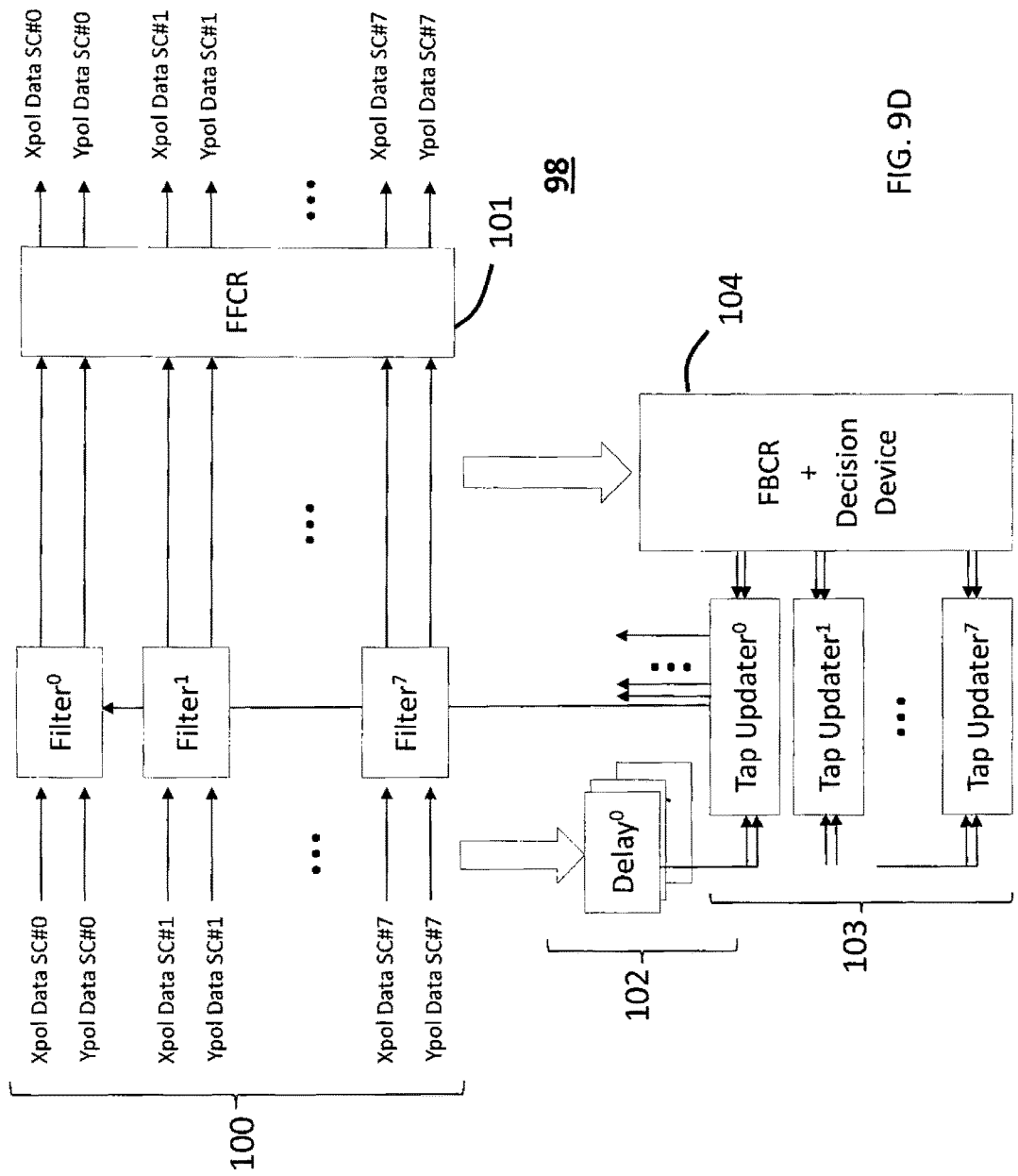

FIG. 9D shows equalizer and carrier recovery block 98 according to an aspect of the present disclosure. FIG. 9D, in some aspects, may be a generalization of the structure of FIG. 6A to accommodate a multi-carrier scenario, as in the present example (of eight sub-carriers). As shown in FIG. 9D, the eight sub-carrier data streams output from the A/D converters 96 of FIG. 9C may consist of pairs of respective data from the X and Y polarization streams, for each sub-carrier. These may be fed into respective equalization filters 100, which may output equalized data streams corresponding, respectively, to the equalizer input data streams. These equalized data streams may be provided to FFCR 101 to obtain output data streams for the respective sub-carriers (which, again, are shown in the form of X and Y polarization data streams for the respective sub-carriers). At the same time, the outputs of filters 100 may be used for filter tap-weight updating. This may be done by feeding back the data streams into an FBCR and decision device 104, which provides data outputs to respective tap updaters 103. The eight input sub-carrier data streams that were provided to filters 100 may be fed, through delays 102, to the respective tap updaters 103, such that the decision data and the input data correspond to each other. As shown, a respective one of tap updaters 103 corresponds to a respective one of filters 100, to provide respective updated tap-weights to the respective filter.

According to an aspect of the present disclosure, each of the eight (in this non-limiting example) sub-carrier filters 100 may be composed of $h_{xx}$, $h_y$, $h_{xy}$ and $h_{yy}$ components, as shown in FIG. 2A and discussed in conjunction therewith above.

According to various aspects of the present disclosure, the sub-carrier multiplexing 91 and de-multiplexing 97 may be performed in the frequency domain, using fast-Fourier transforms (FFTs) and inverse fast-Fourier transforms (IFFTs), and a common dispersion compensation technique may be employed on the transmit side, the receive side, or both.

According to further aspects of the present disclosure, phase estimation in FFCR 101 and FBCR 104 may be implemented in a number of ways. According to one example, separate phase estimates may be obtained for each of the eight sub-carriers. According to a second example, phase estimates may be obtained for respective subsets of the sub-carriers; for example, two phase estimates, based on respective groups of four of the sub-carriers and using averaging of phase estimates, or four phase estimates, based on respective pairs of sub-carriers (and again, using averaging), may be obtained. According to yet a further example, a single phase estimate may be obtained, based on averaging phase estimates corresponding to all eight sub-carriers.

Figure 7:
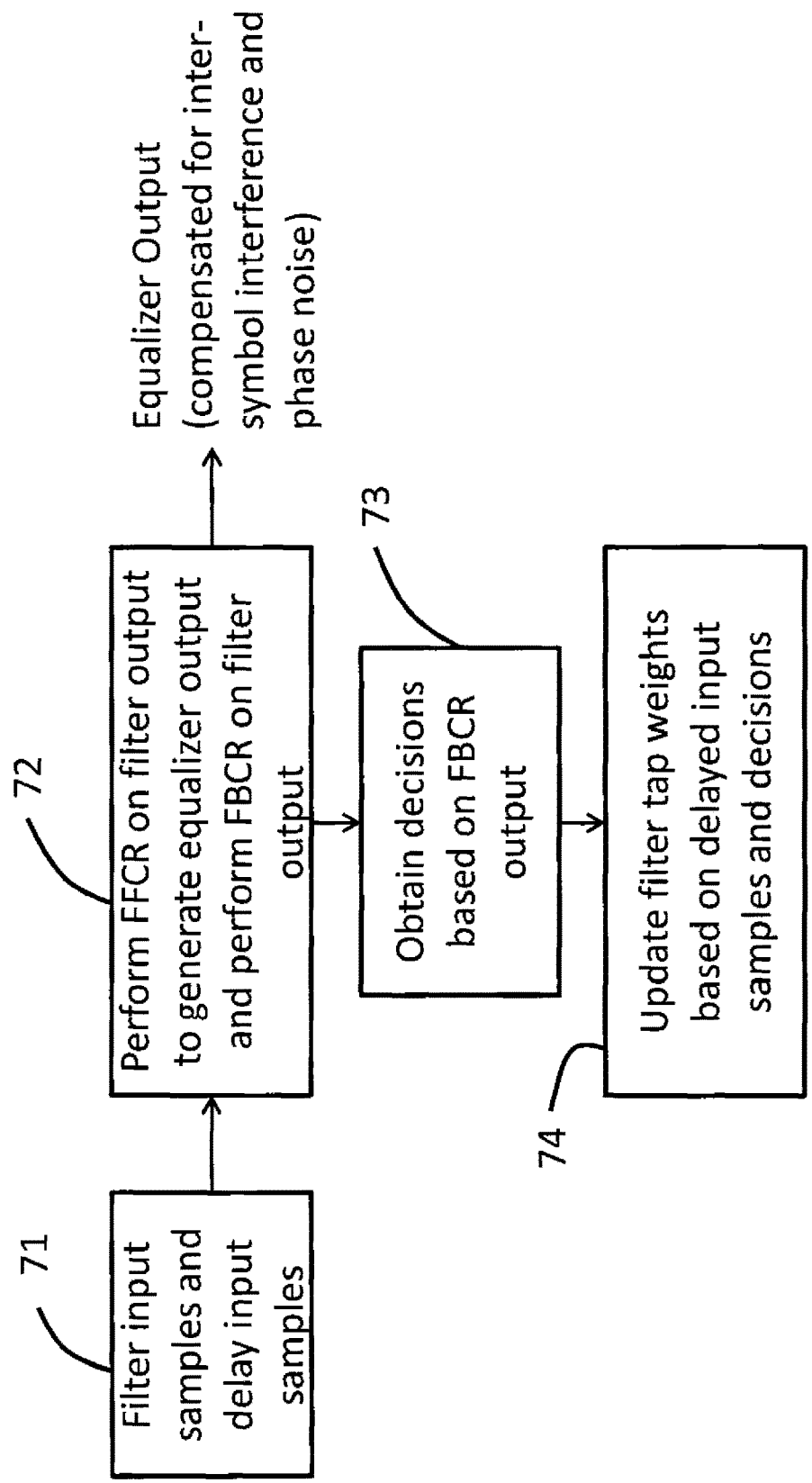
FIG. 7 shows a conceptual flow diagram of a method according to various aspects of the present disclosure.

FIG. 7 shows a conceptual flow diagram of a process according to various aspects of the present disclosure. Input signal samples may be filtered and also delayed 71. FFCR may be performed on the filter outputs to obtain overall phase- and polarization-compensated outputs 72. FBCR may also be performed on the filter outputs 72, and decisions may be made based on the FBCR outputs 73. The decisions and the delayed input signal samples may be used to perform filter tap-weight updating 74.

FIG. 8 shows a conceptual block diagram of an apparatus that may be used in various implementations of aspects of this disclosure. The apparatus of FIG. 8 may include one or more processing devices 81. The one or more processing devices 81 may interface with memory 82, firmware 83 and/or input/output interface(s) ("I/O") 84. Memory 82 and/or firmware 83 may incorporate instructions embodied thereon that may be executed by processing device(s) 81 and may include instructions that may cause the processing device(s) to implement all or some of the operations described in conjunction with FIG. 7 (as well as other processes, such as, but not limited to, one or more operating systems that may be used for basic functionality of the processing device(s)). Some or all of blocks 81-84 may be integrated into a single chip or may be incorporated onto a single processor board.

Various aspects of the disclosure have now been discussed in detail; however, the invention should not be understood as being limited to these aspects. It should also be appreciated that various modifications, adaptations, and alternative embodiments thereof may be made within the scope and spirit of the present invention.

What is claimed is:

1. An adaptive equalizer system, including:
    a filter configured to receive input signal samples and provide a filter output, the filter having a plurality of taps having respective tap-weights;
    a tap-weight updating circuit configured to receive the input signal samples and to update one or more of the tap-weights of the filter;
    a switch circuit to receive the filter output;
    a feedback carrier recovery (FBCR) circuit;
    a first feed-forward carrier recovery (FFCR) circuit, the switch circuit selectively supplying the filter output to one of the FBCR circuit and the first FFCR, such that one of the first FFCR circuit and the FBCR circuit receives the filter output and outputs a first phase-error compensated output;
    a decision circuit configured to receive the first phase-compensated output and to provide decision-based output to the tap-weight updater; and
    a second feed-forward carrier recovery (FFCR) circuit configured to receive and phase-compensate the filter output to obtain a second phase-error compensated output.

2. The adaptive equalizer system of claim 1, further including a delay interposed between the input signal samples and an input to the tap-weight updating circuit.

3. The adaptive equalizer system of claim 1, wherein the tap-weight updating circuit is a least-mean-square-based tap-weight updating circuit.

4. The adaptive equalizer system of claim 1, wherein the first feedback carrier recovery circuit and the decision circuit are integrated together.

5. The adaptive equalizer system of claim 1, wherein the filter comprises a finite-impulse-response (FIR) filter.

6. The adaptive equalizer system of claim 1, wherein at least one of the filter, the tap-weight updating circuit, the FBCR circuit, the decision circuit or the first FFCR circuit is implemented in the form of a chip, chipset or circuit board.

7. The adaptive equalizer system of claim 1, wherein the input signal samples are obtained from an optical fiber transmission system.

8. The adaptive equalizer system of claim 7, wherein the optical fiber transmission system includes multiple sub-carriers, and wherein the adaptive equalizer system includes a corresponding multiplicity of filters and tap-weight updating circuits.

9. A method of adaptive equalization, including:
filtering input signal samples to generate filter output;
updating filter tap-weights of the filtering based at least in part on the input signal samples;
selectively supplying the filter output to one of a feedback carrier recovery (FBCR) circuit and a first feed-forward carrier recovery (FFCR) circuit;
processing the filter output by said one of the FBCR circuit and the first FFCR circuit to output first phase-compensated output;
providing decision-based output based on the first phase-compensated output, and using the decision-based output in the updating filter tap-weights; and
performing feed-forward carrier recovery (FFCR) on the filter output by a second FFCR circuit, in parallel with the processing by said one of the FBCR circuit and the FFCR circuit, to generate equalizer output.

10. The method of claim 9, wherein the input signal samples are delayed prior to being used in the updating filter tap-weights.

11. The method of claim 9, wherein the updating filter tap-weights comprises updating tap-weights using a least-means-squares technique.

12. The method of claim 9, wherein the filtering comprising finite-impulse-response (FIR) filtering.

13. The method of claim 9, further including deriving the input signal samples from an optical fiber transmission system.

14. The method of claim 13, wherein the optical fiber transmission system comprises a plurality of data-bearing sub-carriers, and wherein at least the filtering and the updating filter tap-weights are performed in parallel on input signal samples corresponding to the respective data-bearing sub-carriers.

15. An adaptive equalizer system comprising at least one processor programmed to perform the method according to claim 9.

16. A non-transitory machine-readable medium containing executable instructions configured to cause one or more processing devices to implement operations including:
filtering input signal samples to generate filter output;
updating filter tap-weights of the filtering based at least in part on the input signal samples;
selectively supplying the filter output to one of a feedback carrier recovery (FBCR) circuit and a first feed-forward carrier recovery (FFCR) circuit;
processing the filter output by said one of the FBCR circuit and the first FFCR circuit to output phase-compensated output;
providing decision-based output based on the phase-compensated output, and using the decision-based output in the updating tap weights; and
performing feed-forward carrier recovery (FFCR) on the filter output by a second FFCR circuit, in parallel with the processing by said one of the FBCR circuit and the first FFCR circuit, to generate equalizer output.

17. The non-transitory machine-readable medium of claim 16, wherein the input signal samples are delayed prior to being used in the updating filter tap weights.

18. The non-transitory machine-readable medium of claim 16, wherein the updating tap weights comprises updating tap weights using a least-means-squares technique.

19. The non-transitory machine-readable medium of claim 16, wherein the filtering comprising finite-impulse-response (FIR) filtering.

20. The non-transitory machine-readable medium of claim 16, further including deriving the input signal samples from an optical fiber transmission system.

21. The non-transitory machine-readable medium of claim 20, wherein the optical fiber transmission system comprises a plurality of data-bearing sub-carriers, and wherein at least the filtering and the updating filter tap-weights are performed in parallel on input signal samples corresponding to the respective data-bearing sub-carriers.

* * * * *